UNITED STATES PATENT OFFICE.

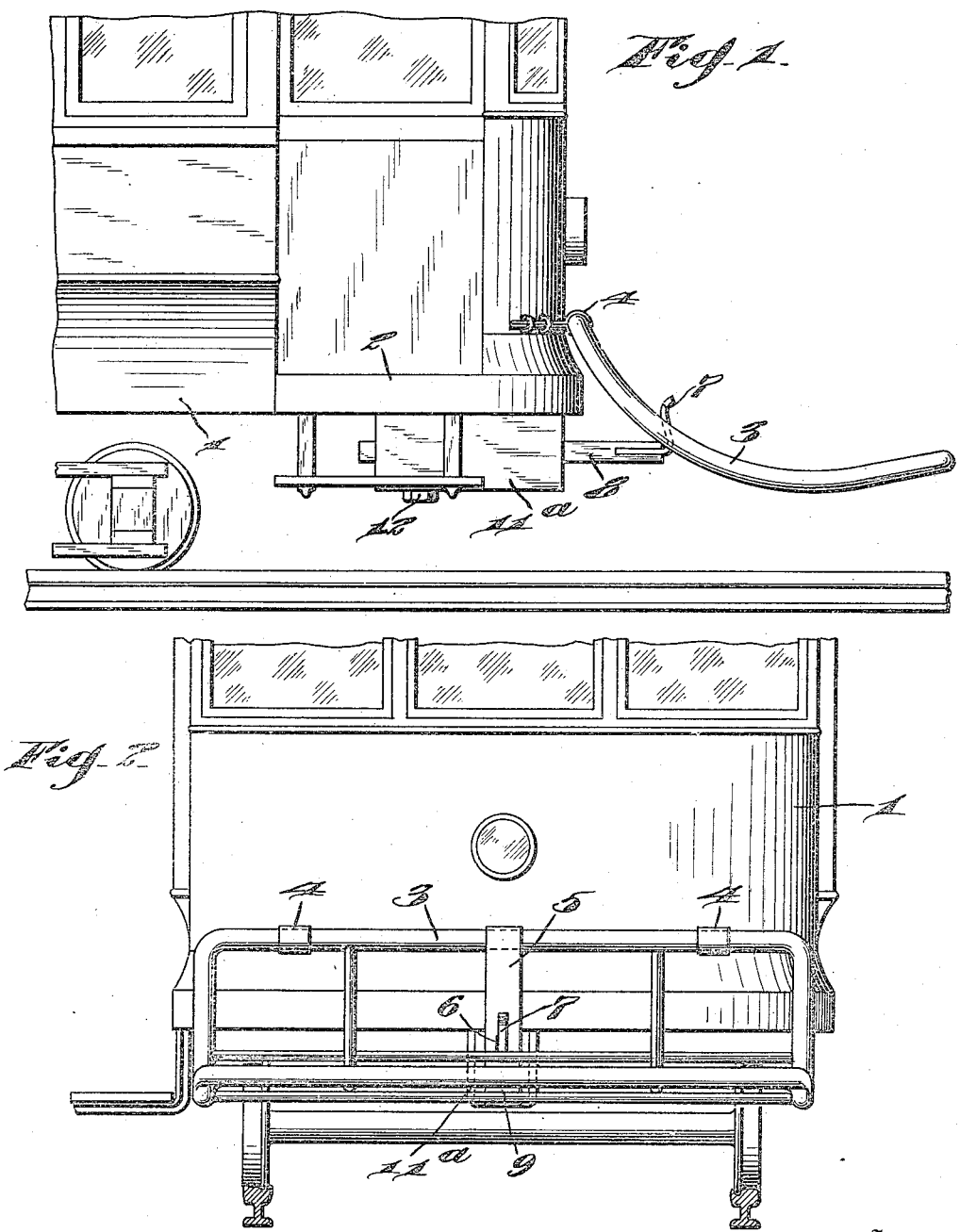

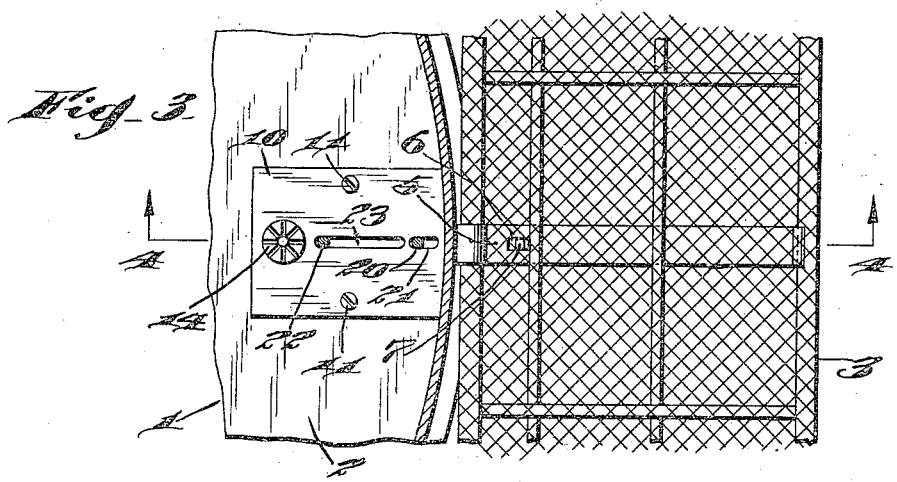
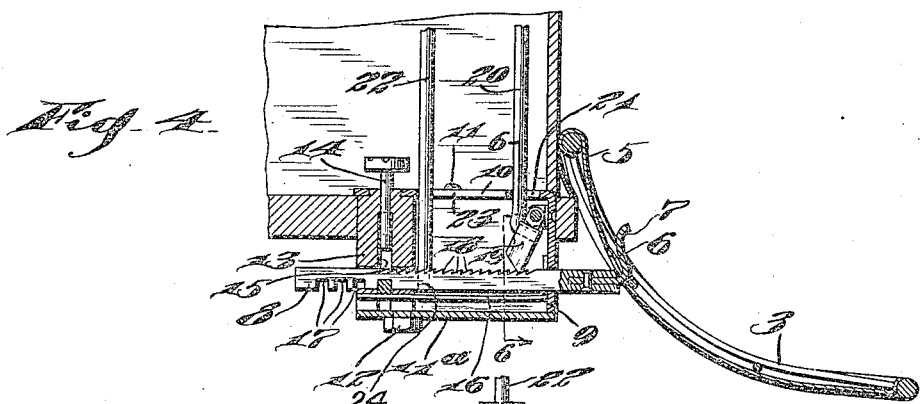
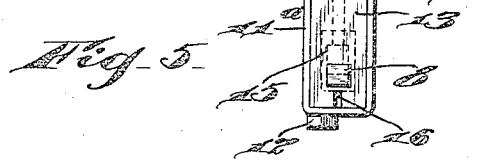
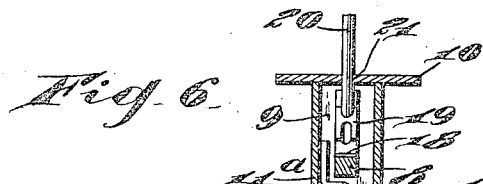

GEORGE KOROS, OF PHILADELPHIA, PENNSYLVANIA.

CAR-FENDER.

962,226.　　Specification of Letters Patent.　Patented June 21, 1910.

Application filed April 4, 1910. Serial No. 553,267.

*To all whom it may concern:*

Be it known that I, GEORGE KOROS, a citizen of the United States, residing at Philadelphia, in the county of Philadelphia and State of Pennsylvania, have invented certain new and useful Improvements in Car-Fenders, of which the following is a specification.

My invention relates to improvements in car fenders, the object of the invention being to provide a pivoted fender with means normally holding the forward end of the fender elevated above the track, and means readily operated by the motorman to release the holding means, permit the fender to fall in close contact with the track, and lock the same in this position, so as to prevent any possibility of a person or object passing under the fender.

A further object is to provide improvements of this character of extremely simple, inexpensive construction, and which permit the fender to be readily set in normal position, and quickly released and locked in operative position as occasion may require.

With these and other objects in view, the invention consists in certain novel features of construction, and combinations and arrangements of parts, as will be more fully hereinafter described and pointed out in the claims.

In the accompanying drawings: Figure 1 is a fragmentary view in side elevation illustrating my improved fender. Fig. 2 is an end view thereof, Fig. 3 is a fragmentary sectional plan view thereof, Fig. 4 is a view in longitudinal section thereof, Fig. 5 is an end view of my improved attachment secured to the car platform, and Fig. 6 is a view in cross section of the same, taken on the line 6, 6, of Fig. 4.

1, represents a car, 2 the front platform, and 3 a fender pivotally supported in suitable brackets 4 at the upper inner ends of the fender secured by U-bolts 4ª to the car 1, as shown. My invention, however, is not limited to the particular fender, nor its pivotal mounting and it may be made in various ways.

The fender is provided with a central longitudinal bar 5, having a slot 6 therein to receive a hook 7, at the forward end of my improved operating bar 8.

Bar 8 is mounted to slide longitudinally in a casing 9, the latter having a top plate 10 secured by screws 11, to the platform 2, and the parts are inclosed in a removable cover 11ª, secured by a bolt 12. The platform 2, is of course, cut out or slotted to receive the casing 9, and the latter is located at the center and forward end of the platform.

The casing includes in its structure, a tubular post 13, in which a vertically movable foot plunger 14 is mounted. This foot plunger has a slotted lower portion 15, which surrounds bar 8, and is normally pressed upward by a flat spring 16, so that the lower end of the plunger is held in one of a series of notches 17, in the lower face of bar 8.

The upper face of bar 8 is provided with ratchet teeth 18, with which a pivoted pawl 19 engages. This pawl 19, has an operating arm or handle 20 secured thereto, and projecting up through a slot 21 in plate 10.

A shifting rod 22 is inserted through a slot 23, in plate 10, and into an opening 24 in bar 8. The purpose of this rod 22 is to move the bar forwardly, and thus elevate the fender, as will now be explained.

Figs. 1 and 2 show the fender in normal elevated position, while Fig. 4 shows the fender down, and locked down in position to pick up a person or object on the track.

Referring particularly to Fig. 4, to elevate the fender to normal position, the operator depresses plunger 14 with his foot, swings handle 20 forwardly to release the pawl 19 from ratchet teeth 18, and then with his other hand pushes rod 22 forward. This movement of rod 22 forces the bar 8 longitudinally, and tilts the fender to the position shown in Fig. 1; then when the pressure is released on the plunger 14, the latter will spring up into one of the notches 17, and lock the parts in this set position.

When the motorman sees a person or object on the track, he depresses plunger 14 with his foot, releasing bar 8. The weight of the fender causes the latter to swing downwardly, and the bar 8 to move backwardly, the ratchet teeth 18 riding under pawl 19, and the latter locking it at each tooth, so that there can be no upward springing movement of the fender, as the hook 7 prevents independent movement of the fender, and the pawl 19 locks bar 8 against outward movement. The hook 7 and fender 3 can, however, be manipulated to release them from locked engagement, by lifting rod 22 out of the opening 24, and holding pawl 19 elevated, while plunger 14 is depressed, when bar 8 may be drawn out of the casing. Rod 22 may then be utilized at the other end of the car or on some other car, thus making it necessary to provide but a single bar 8, and rod 22 for a car.

Various slight changes might be made in the general form and arrangement of parts described without departing from my invention and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a mechanism of the character described, the combination with a car, a fender pivotally connected to the car, and a casing secured to the car, of a longitudinally movable bar mounted in the casing and connected at one end to the fender, said bar having a plurality of notches in its lower face, a vertically movable foot plunger supported on the car, and adapted to engage in any of the notches in the bar to hold it against movement, ratchet teeth on the upper face of said bar, and a pawl engaging said ratchet teeth, substantially as described.

2. In a mechanism of the character described, the combination with a car, a fender pivotally connected to the car, and a casing secured to the car, of a longitudinally movable bar mounted in the casing, and connected at one end to the fender, said bar having a plurality of notches in its lower face, a vertically movable foot plunger supported on the car, and adapted to engage in any of the notches in the bar to hold it against movement, ratchet teeth on the upper face of said bar, a pawl pivoted in said casing and engaging said teeth, a rod secured to said pawl and projecting above the platform of the car, and a rod connected to said bar, substantially as described.

3. In a mechanism of the character described, the combination with a car platform, of a fender pivotally secured to the platform and having a slot therein, of a casing secured in the car platform and having slots in its upper plate, a longitudinally movable bar mounted in the casing, said bar having notches in its lower face and ratchet teeth in its upper face, a hook on the forward end of said bar, engaging in the slot in the fender, a vertically movable plunger, a spring pressing said plunger into one of the notches in the bar, said bar having an opening therein, a rod located in said opening, and projecting through one of the slots in the casing, a pawl engaging the ratchet teeth on the bar, and an upwardly projecting rod on said pawl, extending through another of the slots in said casing, substantially as described.

In testimony whereof I have signed my name to this specification in the presence of two subscribing witnesses.

GEORGE KOROS.

Witnesses:
R. H. KRENKEL,
C. E. POTTS.